No. 867,575. PATENTED OCT. 8, 1907.
C. ELLIS & K. P. McELROY.
PROCESS OF REDUCING FORMIC ACID.
APPLICATION FILED MAY 2, 1907.
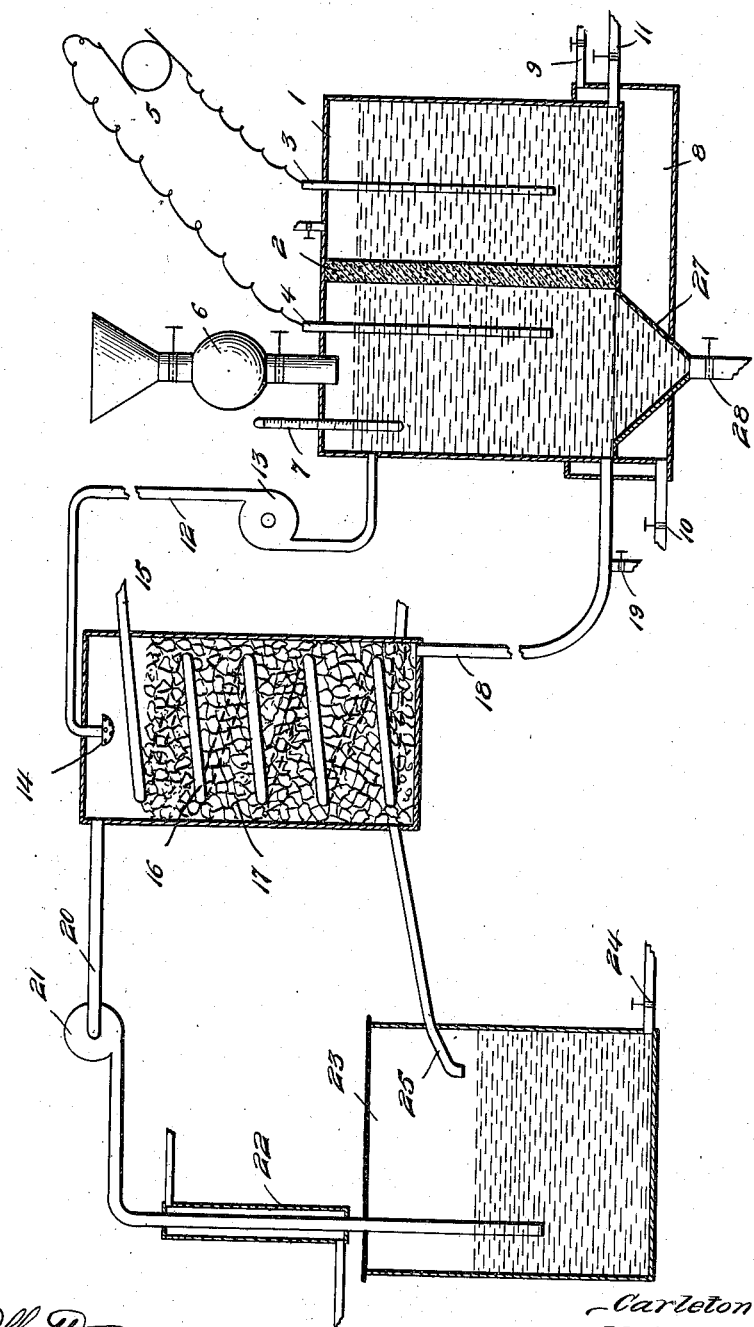

UNITED STATES PATENT OFFICE.

CARLETON ELLIS, OF WHITE PLAINS, NEW YORK, AND KARL P. McELROY, OF WASHINGTON, DISTRICT OF COLUMBIA.

PROCESS OF REDUCING FORMIC ACID.

No. 867,575.   Specification of Letters Patent.   Patented Oct. 8, 1907.

Application filed May 2, 1907. Serial No. 371,387.

*To all whom it may concern:*

Be it known that we, CARLETON ELLIS and KARL P. McELROY, citizens of the United States, residing, respectively, in White Plains, county of Westchester, and State of New York, and in Washington, District of Columbia, have invented certain new and useful Improvements in Processes of Reducing Formic Acid; and we hereby declare the following to be a full, clear, and exact description of the same.

This invention relates to processes of reducing formic acid and consists in a method of electrolytically reducing formic acid to produce methyl alcohol, formaldehyde and condensation products; all as more fully hereinafter set forth and as claimed.

In ordinary electrolysis of monobasic fatty acids and their salts the negative radical or ion, in this case R.COO— (in which R indicates a fatty radical) goes to the anode while the hydrogen or other positive ion goes to the cathode. The group R.COO—, however, being incapable of separate existence breaks up at the anode in the absence of any other group with which it can unite, generally giving carbon dioxid and a hydrocarbon, or, sometimes, giving oxidation products with co-evolved oxygen. Formic acid and its salts usually yield carbon dioxid and water. There is no utility in this reaction and in the present process the formation of these negative ions is suppressed so far as may be and the action upon the formic acid confined to cathodic reactions.

The formation of negative ions in a solution is strictly proportional to the concentration of the H ions therein, no more being produced than are equivalent to such H ions. Formic acid and the higher fatty acids are relatively little capable of dissociating in solution with formation of negative and H ions. In the presence of a strong, freely dissociating mineral acid, the concentration of H ions from this latter source reaches a maximum and such less dissociative, weaker fatty acids tend to remain associated. In other words, the group R.COOH tends to remain as such without formation of H and R.COO— ions; without forming negative ions which can travel to the anode and decompose there. In a two-compartment electrolytic cell, the fatty acid may be retained in the cathode compartment without traveling to the anode to any extent, and in the cathode compartment it may be readily reduced with formation of useful products.

Use of a two-compartment electrolytic cell with the fatty acid in the cathode compartment, it may be here mentioned, while not strictly necessary in the hereinafter described method, is nevertheless advantageous as preventing oxidation and waste of the fatty acid.

In the presence of a strong, freely dissociating acid, like sulfuric, as stated, formic acid ends to remain associated, and the action of the electric current upon its solutions is, so to speak, purely secondary; a reduction by the H ions formed at the cathode. Two main reductions are possible: a replacement of the saturating oxygen of the carboxyl by hydrogen with formation of methyl alcohol, or a replacement of the hydroxyl by hydrogen, forming formaldehyde. Apparently both reactions ordinarily occur and both products are formed, their relative proportions depending, at least to some extent, upon the temperature, the relative concentration of the electrolyzed acids, the current density, the voltage and other conditions. It is possible that the formation of the methyl alcohol, at least to some extent, is due to a secondary reaction, the further reduction of the formaldehyde by excess of hydrogen. Long treatment with large excess of electrolytic hydrogen sometimes produces methane, but this is, of course, to be avoided. Other conditions being equal, low current density appears to form formaldehyde preferentially while high current density gives a greater proportion of methyl alcohol. Both products are ordinarily formed and both are valuable.

Formic acid being somewhat sensitive to the dehydrating action of strong concentrated acids, with production of carbon monoxid and water, it is better to work at rather low temperatures and in the presence of mineral acid not too concentrated. In the presence of rather strong sulfuric acid, polymerized formaldehyde is likely to be produced to some extent. Any freely dissociating mineral acid is suitable, but sulfuric acid is at present preferred, as it ionizes more freely than phosphoric and does not attack anodes like hydrochloric. A ten per cent. solution of sulfuric acid is amply strong, reducing the amount of negative formic ions to a negligible concentration. It is frequently advantageous to have the strength of the sulfuric acid in the neighborhood of ten per cent.

As facilitating the reaction, cathodes possessing the peculiar property known as "overvoltage," such as lead cathodes, are advantageous. Spongy nickel, iron or cobalt cathodes are also advantageous because of the peculiar relation of these metals to hydrogenating reactions, such as this. Platinized platinum may also be employed. Preferably the current is kept rather low. The presence of facilitating catalytics, such as cerium salts, is advantageous. In the electrolysis there is ordinarily no special advantage, in the specific embodiment of this method hereinafter described, in working at greater than ordinary temperature.

In discontinuous operations, the formic acid may be employed in the form of one of its salts, such as calcium or sodium formate, a proper excess of mineral acid being used, but in continuous operations it is ordinarily better to use the formic acid itself.

Any ordinary electrolytic cell may be used, but, as stated, it is considered better to use a two-compartment device, the compartments being separated by the ordinary porous wall and the formic acid kept around the cathode.

In continuous operation, an advantageous method of working is to withdraw the acid liquid from the cathode compartment, either continuously or from time to time, distil out the methyl alcohol and formaldehyde formed, thereby shielding these reduction products from further reduction and return the liquid to serve anew. Methyl alcohol has a low boiling point while that of formic acid is near that of water, and, in solution, it raises that of water, so that distillation is easily practicable. Not much formic acid goes over and that which does may readily be recovered for return to the electrolyzer in the subsequent fractionation of the alcoholic distillate, where an acid-free distillate is desired. For many purposes however the amount of formic acid in the first distillate is not enough to be injurious and it may even be desirable, formic acid having good disinfecting powers and, since it is a fairly strong acid, enhancing the solvent powers of the alcohol for some purposes. The distillation part of the cycle may be performed in any ordinary column still suited to handle acid liquids. Another method of distillation which offers the advantage of not requiring expensive apparatus, is to pass the liquid from the cathode compartment in thin films or layers over suitable surfaces and there strip it of low boiling constituents by a current of gas, also preferably traveling in a closed cycle through a suitable condensing apparatus.

The distillate or condensate ordinarily forms a solution of methyl alcohol, formaldehyde and some formic acid, and can readily be handled for fractionation and recovery of pure strong products in the usual fractionating apparatus, such as column stills. It may, however, as stated, be employed direct for any purpose for which it is suitable.

In the described method of operation, the same quantity of mineral acid, e. g., sulfuric, may of course be employed for a long time. With the formic acid should be added enough water to replace that taken out in the stripping operation, and liquid from the anode compartment may be occasionally added to the cathode compartment to keep the concentration of the mineral acid within the desired limits.

In the accompanying illustration is shown one combination of apparatus of the many types adapted to perform the described process.

In this showing, 1 designates, as a whole, an ordinary two-compartment electrolytic cell divided by porous partition 2. It contains the anode 3, which may be of carbon, platinum or any other suitable conductor, and the cathode, 4, both being connected to a suitable source of current, 5. The double-valved funnel 6 allows introduction of formic acid, sulfuric acid or water. Thermometer 7 permits observation of temperature and the heating or cooling jacket 8, provided with inlet and outlet 9 and 10, allows control of the same. Valved pipe 11 is provided for withdrawal of liquid from the anode chamber. Outlet pipe 12 permits withdrawal of liquid from the cathode chamber by means of pump 13 and delivery by means of distributing device 14 into a stripping chamber 15. This chamber, as shown, contains a steam coil 16, preferably of lead pipe, and may also contain, as shown, coke or other material, 17, of large surface. From the chamber the liquid which has trickled down the steam coil and coke is returned to the cathode chamber by means of pipe 18, provided with a valved outlet 19, for use when it is desired to empty the cathode chamber or test the liquid by analysis.

Leading from the top of the stripping chamber or coke tower, is a pipe 20, provided with fan 21 and passing through a cooling and condensing jacket 22 into a seal-pot 23. The seal-pot has a valved outlet 24 for withdrawing a portion of its contents from time to time. The uncondensed gas mass from the stripping chamber bubbles through the liquid in the seal-pot and returns through pipe 25 into the stripping chamber. This pipe is preferably given, as shown, an upward slant and ends somewhat above the bottom of the stripping chamber.

The stripping tower shown may be replaced by an ordinary column still if desired, but the arrangement shown is simple and effective.

When insoluble salts are formed in the cathode chamber, as in the use of formates of the alkaline earths with sulfuric acid, they may be readily removed by funnel bottom 27, valved at 28. This also serves to remove any solid polymerized formaldehyde which may form.

The operation of this apparatus is obvious. The formic acid is introduced continuously, or from time to time, through the valved funnel into the cathode bath. As it is reduced therein by the action of the current, the acid containing the reduction products is withdrawn and stripped of the same in the stripping chamber by the action of the circulating gas mass, which may be air or any suitable gas. Using air, its oxygen is usually withdrawn by oxidation of the methyl alcohol, etc., leaving a residue of inert nitrogen. The closed circuit for the gas has the advantage that no methyl alcohol or formaldehyde is lost by escaping condensation in the condensing means. When stripped of volatile bodies, the cathode liquid is returned to the cathode chamber to serve anew.

In discontinuous operation, the cathode compartment may be emptied from time to time through the funnel bottom shown. This structure is also advantageous in handling calcium formate and similar formates forming insoluble sulfates by double decomposition with sulfuric acid. For instance, a mixture of a solution of calcium formate with the correct amount of sulfuric acid may be directly introduced through the funnel. As sulfate of calcium accumulates, it is withdrawn by the hopper bottom.

Other fatty acids of the monobasic fatty acid series, such as acetic, propionic, butyric and the like may be similarly treated by this method and with this apparatus, giving reduction products valuable as solvents and for other purposes.

What we claim is:

1. The process of reducing acids of the monobasic fatty acid series with formation of aldehydes and alcohols which consists in electrolyzing the same in the presence of a stronger mineral acid.

2. The process of reducing acids of the monobasic fatty series with the formation of aldehydes and alcohols which consists in electrolyzing the same in the presence of sulfuric acid.

3. The process of reducing formic acid which consists in electrolyzing the same in the presence of a stronger mineral acid.

4. The process of reducing formic acid which consists in electrolyzing the same in the presence of sulfuric acid.

5. The process of reducing formic acid which consists in electrolyzing the same in a cathode compartment in the presence of a stronger mineral acid.

6. The process of reducing formic acid which consists in electrolyzing the same in a cathode compartment in the presence of sulfuric acid.

7. The process of reducing fatty acids which consists in electrolyzing the same in the presence of a stronger mineral acid, removing a portion of the bath from time to time, distilling out reduction products and returning the residual liquid to serve anew.

8. The process of reducing formic acid which consists in electrolyzing the same in the presence of a stronger mineral acid, removing a portion of the bath from time to time, distilling out reduction products and returning the residual liquid to serve anew.

9. The process of reducing fatty acids which consists in electrolyzing the same in the presence of a stronger mineral acid, removing a portion of the reduced liquid, passing the same through a stripping still and returning to the electrolytic bath with addition of more fatty acid.

10. The process of reducing formic acid which consists in electrolyzing the same in the presence of a stronger mineral acid, removing a portion of the reduced liquid, passing the same through a stripping still and returning to the electrolytic bath with addition of more formic acid.

11. In the electrolytic reduction of organic compounds, the process of continuously recovering volatile reduction products which consists in removing a portion of the electrolyzed and reduced liquid, passing the same through a stripping still to remove such volatile reduction products, and returning the stripped liquid to the electrolytic bath.

12. In the electrolytic reduction of organic compounds, the process of continuously recovering volatile reduction products which consists in removing a portion of the electrolyzed and reduced liquid, passing the same through a stripping still in filmiform condition against a circulating gas mass to remove such volatile products, and returning the stripped liquid to the electrolytic bath.

13. In the electrolytic reduction of organic compounds, the process of continuously recovering volatile reduction products which consists in removing a portion of the electrolyzed and reduced liquid, heating and filming the same, circulating a gas mass in closed circuit through a condenser, over the filmed liquid and back to the condenser and thereby stripping said liquid of volatile products, and returning the stripped liquid for renewed electrolysis.

14. In the electrolytic reduction of organic compounds, the process of recovering volatile reduction products which consists in filming and heating the electrolytically reduced liquid and while in such filmed and heated condition stripping it by a circulating gas mass traveling in closed circuit through a condenser, and reëlectrolyzing the stripped liquid.

In testimony whereof, we affix our signatures in the presence of witnesses.

CARLETON ELLIS.
K. P. McELROY.

Witnesses for Ellis:
  FLETCHER P. SCOFIELD,
  FRED I. SMITH.
Witnesses for McElroy:
  B. L. CHADWELL,
  A. M. HOUGHTON.